US010931913B2

(12) United States Patent
Tanikawa

(10) Patent No.: US 10,931,913 B2
(45) Date of Patent: Feb. 23, 2021

(54) RECEPTION APPARATUS, TRANSMISSION APPARATUS, CONTROL METHOD, TRANSMISSION METHOD, AND PROGRAM

(71) Applicant: Sony Interactive Entertainment Inc., Tokyo (JP)

(72) Inventor: Masakazu Tanikawa, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/088,201

(22) PCT Filed: Oct. 26, 2016

(86) PCT No.: PCT/JP2016/081768
§ 371 (c)(1),
(2) Date: Sep. 25, 2018

(87) PCT Pub. No.: WO2017/179230
PCT Pub. Date: Oct. 9, 2017

(65) Prior Publication Data
US 2019/0356880 A1    Nov. 21, 2019

(30) Foreign Application Priority Data
Apr. 14, 2016 (JP) .............................. JP2016-081473

(51) Int. Cl.
*H04N 7/01*        (2006.01)
*H04N 21/436*    (2011.01)
*H04N 21/4402*  (2011.01)

(52) U.S. Cl.
CPC ......... *H04N 7/0127* (2013.01); *H04N 21/436* (2013.01); *H04N 21/4402* (2013.01)

(58) Field of Classification Search
None
See application file for complete search history.

(56) References Cited

U.S. PATENT DOCUMENTS 7,822,282 B2 * 10/2010 Kajiwara ............... H04N 19/17
382/240
10,317,681 B2    6/2019 Ishikawa
(Continued)

FOREIGN PATENT DOCUMENTS

CN        101272461 A    9/2008
CN        103237206 A    8/2013
(Continued)

OTHER PUBLICATIONS

International Search Report for corresponding PCT Application No. PCT/JP2016/081768, 2 pages, dated Jan. 24, 2017.
(Continued)

*Primary Examiner* — Carl Adams
(74) *Attorney, Agent, or Firm* — Matthew B. Dernier, Esq.

(57) ABSTRACT

Provided are a reception apparatus, a transmission apparatus, a control method, a transmission method, and a program that can control a frame image size of each frame image so that the frame image constituting a moving image is transmitted at an appropriate timing. A frame-image reception section receives a first frame image constituting the moving image. A control-data update section performs control so that the frame image size of a second frame image constituting the moving image, which is received after the first frame image, corresponds to a time required to receive the first frame image.

14 Claims, 9 Drawing Sheets

(56) References Cited

U.S. PATENT DOCUMENTS

| | | | | |
|---|---|---|---|---|
| 2001/0033620 A1* | 10/2001 | Itokawa | ............... | H04N 19/64 |
| | | | | 375/240.28 |
| 2002/0083461 A1* | 6/2002 | Hutcheson | ............. | A63F 13/12 |
| | | | | 725/91 |
| 2003/0001868 A1* | 1/2003 | Sack | ..................... | G06T 9/001 |
| | | | | 345/660 |
| 2008/0062874 A1* | 3/2008 | Shimadoi | ............... | H04L 43/00 |
| | | | | 370/232 |
| 2008/0231756 A1 | 9/2008 | Kondo | | |
| 2015/0049002 A1 | 2/2015 | Ishikawa | | |
| 2017/0200253 A1* | 7/2017 | Ling | ....................... | G06T 1/20 |
| 2017/0294169 A1* | 10/2017 | Lee | .................... | G09G 3/3677 |

FOREIGN PATENT DOCUMENTS

| | | |
|---|---|---|
| CN | 104221077 A | 12/2014 |
| JP | 2008219479 A | 9/2008 |
| JP | 2008301309 A | 12/2008 |
| JP | 2017069849 A | 4/2017 |

OTHER PUBLICATIONS

Notification of Reason for Refusal for corresponding JP Application No. 2018-511875, 9 pages, dated Jun. 4, 2019.
International Preliminary Report on Patent Ability and Written Opinion for corresponding PCT Application No. PCT/JP2016/081768, 14 pages, dated Oct. 16, 2018.
Office Action for corresponding CN Application No. 201680084363.5, 23 pages, dated Jul. 17, 2020.

* cited by examiner ial field

The present invention relates to a reception apparatus, a transmission apparatus, a control method, a transmission method, and a program.

BACKGROUND ART

A head-mounted display (HMD) equipped with a communication function is known.

SUMMARY

Technical Problem

In recent years, transmission and reception of a moving image through wireless communication has been studied. For example, it has been studied that a moving image that expresses play conditions of a game, which is generated by a game machine that executes a game program, is transmitted wirelessly to an HMD and is displayed on the HMD. In this case, it is preferable that the moving image displayed on the HMD is high-definition as far as possible, and therefore it is preferable that a frame image size of a frame image constituting the moving image is large as far as possible.

However, in wireless communication that needs to be instantaneous as described above, to reduce uncomfortable feeling of a player in an operation, it is important that each frame image is transmitted to a reception apparatus so as not to be late for a predetermined display timing even if the frame image is downsized.

In view of the foregoing, it is an object of the present invention to provide a reception apparatus, a transmission apparatus, a control method, a transmission method, and a program that are capable of controlling the frame image size of each frame image so that the frame image constituting the moving image is transmitted at an appropriate timing.

Solution to Problem

In order to solve the problem described above, a reception apparatus according to the present invention includes a reception section configured to receive a first frame image constituting a moving image, and a frame-image size control section configured to perform control so that a frame image size of a second frame image constituting the moving image, which is received after the first frame image, corresponds to a time required to receive the first frame image.

According to one mode of the present invention, when the time required to receive the first frame image exceeds a target time, the frame-image size control section performs control so that the frame image size of the second frame image becomes smaller than a frame image size of the first frame image.

In this mode, when the frame image size of the first frame image is a predetermined lower limit and the time required to receive the first frame image exceeds the target time, the frame-image size control section may perform control so that a frame rate at which a frame image constituting the moving image is transmitted, which is received after the first frame image, becomes small.

Further, when the time required to receive the first frame image does not exceed a predetermined time shorter than the target time, the frame-image size control section may perform control so that the frame image size of the second frame image becomes larger than the frame image size of the first frame image.

Further, according to one mode of the present invention, the frame-image size control section performs control so that the frame image size of the second frame image, which is received after a next frame image of the first frame image, corresponds to the time required to receive the first frame image and a time from transmission of a transmission request of the next frame image of the first frame image up to reception of a monitor packet transmitted in accordance with the transmission request.

Further, according to one mode of the present invention, whenever receiving the frame image constituting the moving image, the frame-image size control section performs control so that a frame image size of the frame image constituting the moving image, which is received after the frame image, corresponds to the time required to receive the frame image.

Further, according to one mode of the present invention, the reception section receives the first frame image via a first communication path, the reception section receives a copy of the first frame image via a second communication path different in a frequency band from the first communication path, and the frame-image size control section performs control so that the second frame image received via one of the first communication path and the second communication path and a frame image size of a copy of the second frame image received via another communication path correspond to the time required to receive the frame image or the copy of the frame image that is received earlier.

Further, according to one mode of the present invention, the reception apparatus further includes a head mounted display, in which the frame-image size control section performs control so that the frame image size of the second frame image constituting the moving image corresponds to a change amount of a posture or position of the head mounted display.

Further, according to one mode of the present invention, the frame-image size control section performs control so that the frame image size of the second frame image constituting the moving image corresponds to wireless-physical-layer information regarding communication through the reception apparatus.

Further, a transmission apparatus according to the present invention includes a transmission section configured to transmit a first frame image constituting a moving image to a reception apparatus, and a reception section configured to receive designation of a frame image size in accordance with a time required to receive the first frame image from the reception apparatus, in which in accordance with reception of the designation, the transmission section transmits a second frame image constituting the moving image, in which the frame image size corresponds to the designation, to the reception apparatus.

Further, a control method according to the present invention includes a step of receiving a first frame image constituting a moving image, and a step of performing control so that a frame image size of a second frame image constituting the moving image, which is received after the first frame image, corresponds to a time required to receive the first frame image.

Further, a transmission method according to the present invention includes a step of transmitting a first frame image constituting a moving image to a reception apparatus, a step of receiving designation of a frame image size in accordance with a time required to receive the first frame image from the reception apparatus, and a step of transmitting a second frame image constituting the moving image, in which the frame image size corresponds to the designation, to the reception apparatus in accordance with reception of the designation.

Further, a program according to the present invention causes a computer to execute a procedure for receiving a first frame image constituting a moving image, and a procedure for performing control so that a frame image size of a second frame image constituting the moving image, which is received after the first frame image, corresponds to a time required to receive the first frame image.

Further, another program according to the present invention causes a computer to execute a procedure for transmitting a first frame image constituting a moving image to a reception apparatus, a procedure for receiving designation of a frame image size in accordance with a time required to receive the first frame image from the reception apparatus, and a procedure for transmitting a second frame image constituting the moving image, in which the frame image size corresponds to the designation, to the reception apparatus in accordance with reception of the designation.

DESCRIPTION OF EMBODIMENT

Hereinafter, an embodiment of the present invention will be described with reference to the drawings.

Figure 1:
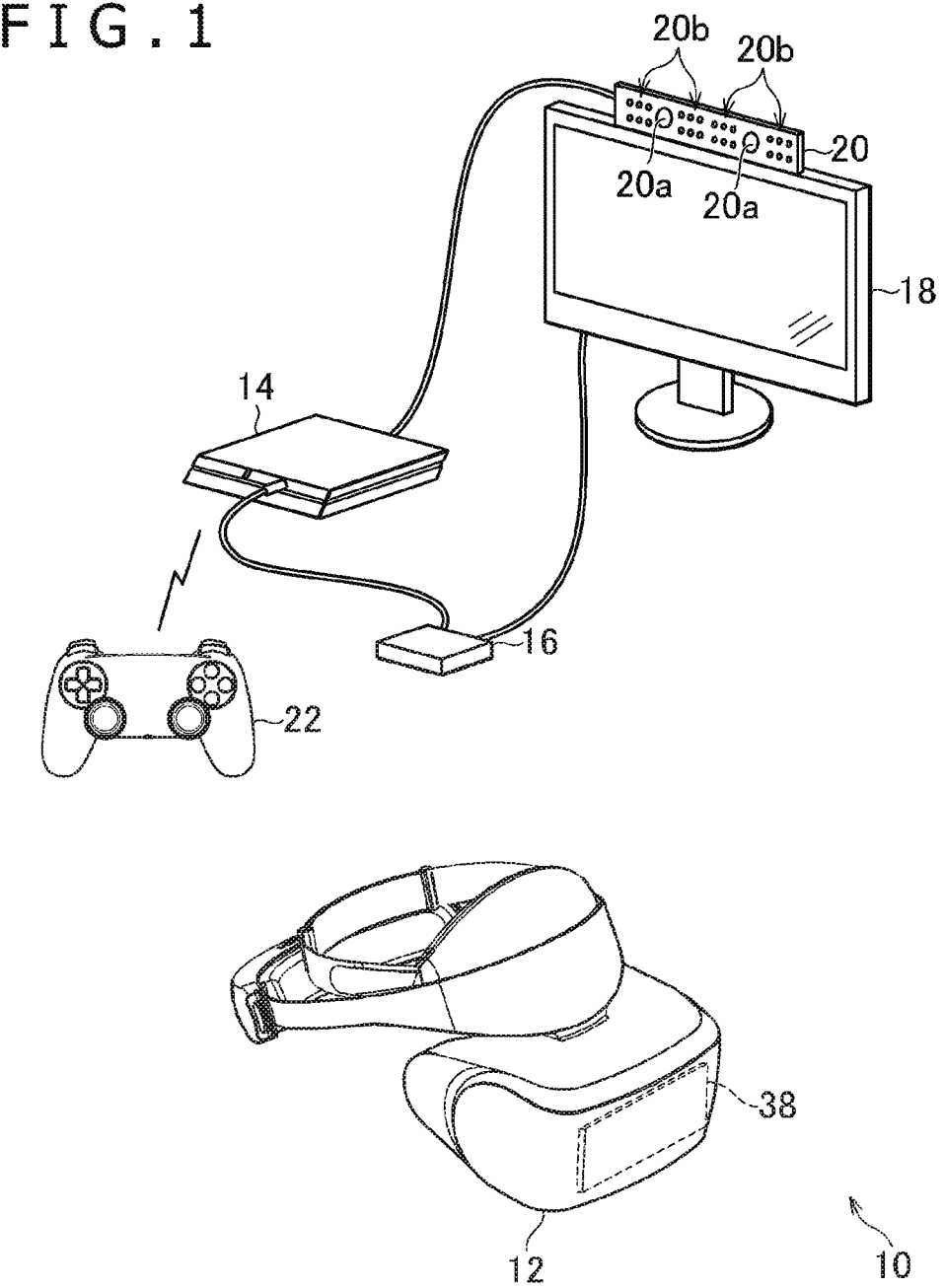
FIG. 1 is a diagram illustrating an example of the entire configuration of a video display system according to an embodiment of the present invention.
Figure 2A:
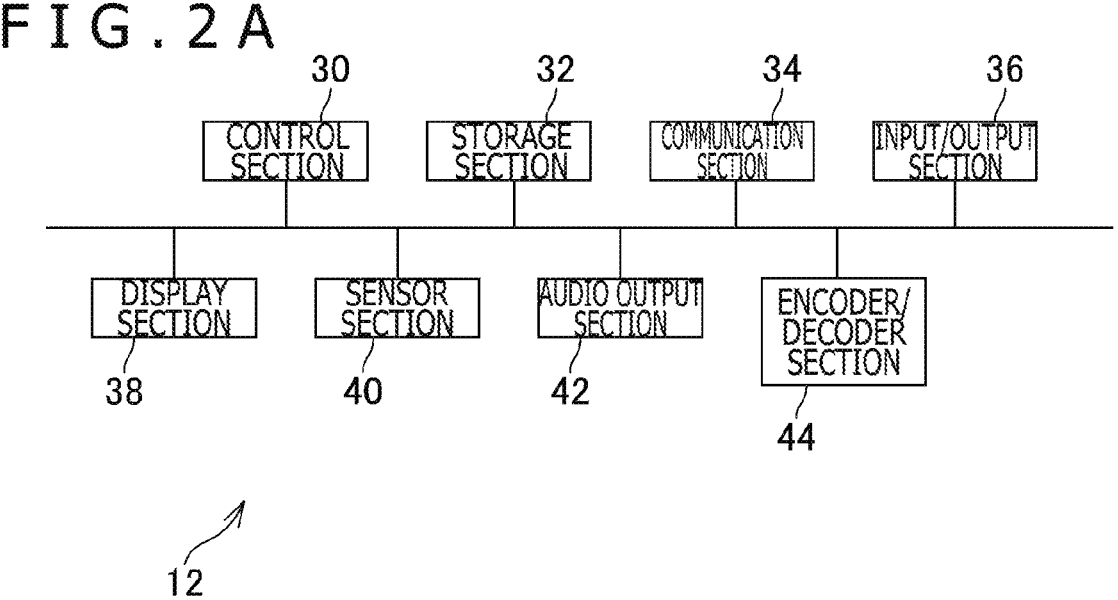
FIG. 2A is a diagram illustrating an example of a configuration of a head-mounted display according to the embodiment of the present invention.

FIG. 1 is a diagram illustrating an example of an entire configuration of a video display system 10 according to an embodiment of the present invention. FIG. 2A is a diagram illustrating an example of a configuration of a head-mounted display (HMD) 12 according to the present embodiment.

Figure 2B:
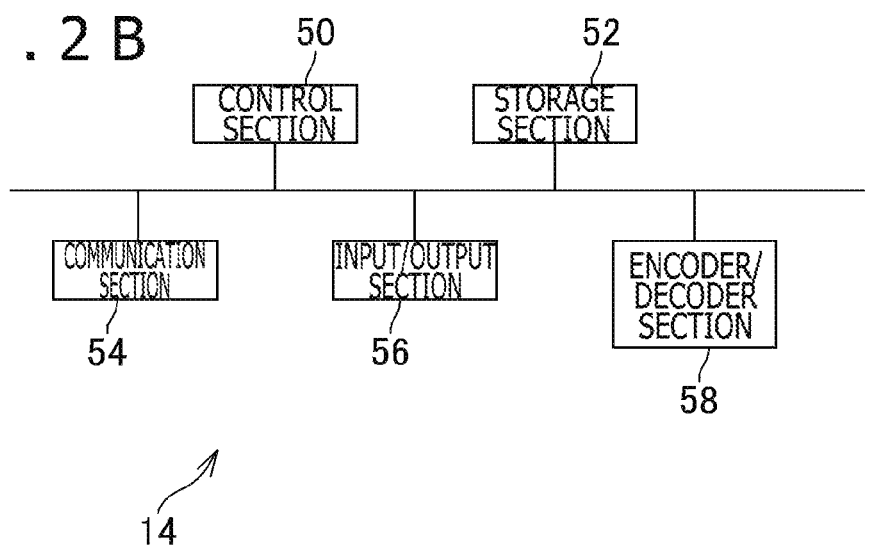
FIG. 2B is a diagram illustrating an example of a configuration of an entertainment apparatus according to the embodiment of the present invention.

FIG. 2B is a diagram illustrating an example of a configuration of an entertainment apparatus 14 according to the present embodiment.

As illustrated in FIG. 1, the video display system 10 according to the present embodiment includes the HMD 12, the entertainment apparatus 14, a relay apparatus 16, a display 18, a camera-microphone unit 20, and a controller 22.

In the HMD 12 according to the present embodiment, as illustrated in FIG. 2A, for example, a control section 30, a storage section 32, a communication section 34, an input/output section 36, a display section 38, a sensor section 40, an audio output section 42, and an encoder/decoder section 44 are included.

The control section 30 is a program control device such as a microprocessor operating in accordance with programs installed in the HMD 12.

The storage section 32 is a storage element such as a read-only memory (ROM) or a random access memory (RAM). In the storage section 32, programs or the like executed by the control section 30 are stored.

The communication section 34 is a communication interface such as a wireless local area network (LAN) module. Further, in the present embodiment, by using a known adaptive modulation and coding technique, depending on a radio wave condition of wireless communication, a modulation scheme or a coding scheme of the communication section 34 is allowed to be adaptively changed. Further, the communication section 34 according to the present embodiment may output wireless-physical-layer information regarding communication by the communication section 34 to the control section 30 at a predetermined sampling rate. Here, for example, the wireless-physical-layer information may be information indicating an environment of wireless communication depending on a radio wave condition of wireless communication and a communication state of a control signal of a wireless-physical-layer in communication by the communication section 34. In this case, examples of the wireless-physical-layer information may include information changing depending on a radio wave condition of wireless communication such as a received signal strength (RSSI), a signal noise ratio (SNR), and a modulation coding scheme and information indicating a communication state of a control signal of a wireless-physical-layer such as a beacon transmission/reception period in Institute of Electrical and Electronics Engineers (IEEE) 802.11 standard, and the like.

The input/output section 36 is an input/output port such as a high-definition multimedia interface (registered trademark) (HDMI) port, a universal serial bus (USB) port, or an auxiliary (AUX) port.

The display section 38 is a display disposed on the front side of the HMD 12, such as a liquid crystal display or an organic electroluminescence (EL) display and displays videos or the like generated by the entertainment apparatus 14. Further, the display section 38 is housed in a chassis of the HMD 12. For example, the display section 38 may receive video signals output by the entertainment apparatus 14 and relayed by the relay apparatus 16, and output videos indicated by the video signals. The display section 38 according to the present embodiment displays, for example, a left-eye image and a right-eye image to thereby display a three-dimensional image. In addition, it may safely be said that the display section 38 cannot display a three-dimensional image but can only display a two-dimensional image.

The sensor section 40 is a sensor such as an acceleration sensor or a motion sensor. The sensor section 40 outputs a measurement result of a rotation amount, a movement amount, or the like of the HMD 12 to the control section 30 at a predetermined sampling rate.

The audio output section 42 is, for example, headphones, a speaker, or the like and outputs audio or the like represented by audio data generated by the entertainment apparatus 14. The audio output section 42 receives, for example, audio signals output by the entertainment apparatus 14 and relayed by the relay apparatus 16, and audio represented by the audio signals.

The encoder/decoder section 44 is, for example, hardware for encoding or decoding data of content. The encoder/decoder section 44 encodes data of content such as a moving image generated by the control section 30 or data of content such as a moving image stored in the storage section 32. In addition, the encoder/decoder section 44 decodes data of content received by the communication section 34, for example.

The entertainment apparatus 14 according to the present embodiment is a computer such as a game console, a digital versatile disc (DVD) player, or a Blu-ray (registered trademark) player. The entertainment apparatus 14 according to the present embodiment, for example, executes a stored game program, reproduces content recorded on an optical disk, or the like to thereby generate a video or audio. Then, the entertainment apparatus 14 according to the present embodiment outputs video signals representing the generated videos or audio signals representing the generated audio via the relay apparatus 16 to the HMD 12 or the display 18.

As illustrated in FIG. 2B, for example, the entertainment apparatus 14 according to the present embodiment includes a control section 50, a storage section 52, a communication section 54, an input/output section 56, and an encoder/decoder section 58.

The control section 50 is a program control device such as a central processing unit (CPU) operating in accordance with programs installed in the entertainment apparatus 14. The control section 50 according to the present embodiment also includes a graphics processing unit (GPU) that draws an image on a frame buffer on the basis of a graphics command or data supplied from the CPU.

The storage section 52 is, for example, a memory device such as a ROM or RAM, a hard disk drive, or the like. In the storage section 52, a program or the like executed by the control section 50 is stored. Further, in the storage section 52 according to the present embodiment, an area of the frame buffer on which an image is drawn by the GPU is secured.

The communication section 54 is a communication interface or the like such as a wireless LAN module.

The input/output section 56 is an input/output port such as an HDMI (registered trademark) port, or a USB port.

The encoder/decoder section 58 is, for example, hardware for encoding or decoding data of content. The encoder/decoder section 58 encodes data of content such as a moving image generated by the control section 50 or data of content such as a moving image stored in the storage section 52. In addition, the encoder/decoder 58 decodes, for example, data of content received by the communication section 54.

The relay apparatus 16 according to the present embodiment is a computer that relays the video signals or audio signals output from the entertainment apparatus 14 and that outputs the video signals or audio signals to the HMD 12 or display 18.

The display 18 according to the present embodiment is, for example, a liquid crystal display or the like and displays videos etc. represented by the video signals output from the entertainment apparatus 14.

The camera-microphone unit 20 according to the present embodiment includes, for example, cameras 20a that output an image obtained by imaging a photographic object to the entertainment apparatus 14 and microphones 20b that acquire ambient audio, convert the audio into audio data, and output the audio data to the entertainment apparatus 14. Further, the cameras 20a according to the present embodiment are a stereo camera.

The HMD 12 and the relay apparatus 16 can, for example, transmit and receive data mutually by wireless communication. The entertainment apparatus 14 and the relay apparatus 16 are, for example, connected through an HDMI cable, a USB cable, or the like and can transmit and receive data mutually. The relay apparatus 16 and the display 18 are, for example, connected through an HDMI cable or the like. The entertainment apparatus 14 and the camera-microphone unit 20 are, for example, connected through an AUX cable or the like.

The controller 22 according to the present embodiment is an operation input apparatus that performs an operation input to the entertainment apparatus 14. A user depresses a direction key or button or tilts an operation stick included in the controller 22 to thereby perform various types of operation inputs by using the controller 22. Then, in the present embodiment, the controller 22 outputs input data made correspondent to the operation input to the entertainment apparatus 14. Further, the controller 22 according to the present embodiment includes a USB port. Then, the controller 22 is connected to the entertainment apparatus 14 through a USB cable to thereby output input data by wire to the entertainment apparatus 14. Further, the controller 22 according to the present embodiment includes a wireless communication module or the like and can also output the input data wirelessly to the entertainment apparatus 14.

In the present embodiment, for example, the entertainment apparatus 14 executes a program of a game installed in the entertainment apparatus 14. Then, in accordance with a play condition of the game, a moving image generated by the entertainment apparatus 14 is displayed on the display section 38 of the HMD 12. Hereinafter, the moving image is referred to as a play moving image.

The play moving image according to the present embodiment includes a plurality of frame images. In the present embodiment, with regard to each of the plurality of frame images, the HMD 12 transmits a transmission request to the entertainment apparatus 14. In accordance with the transmission request, the entertainment apparatus 14 transmits the requested frame image to the HMD 12. Note that in the present embodiment, transmission of the transmission request as well as that of the frame image is performed via the relay apparatus 16.

Figure 3:
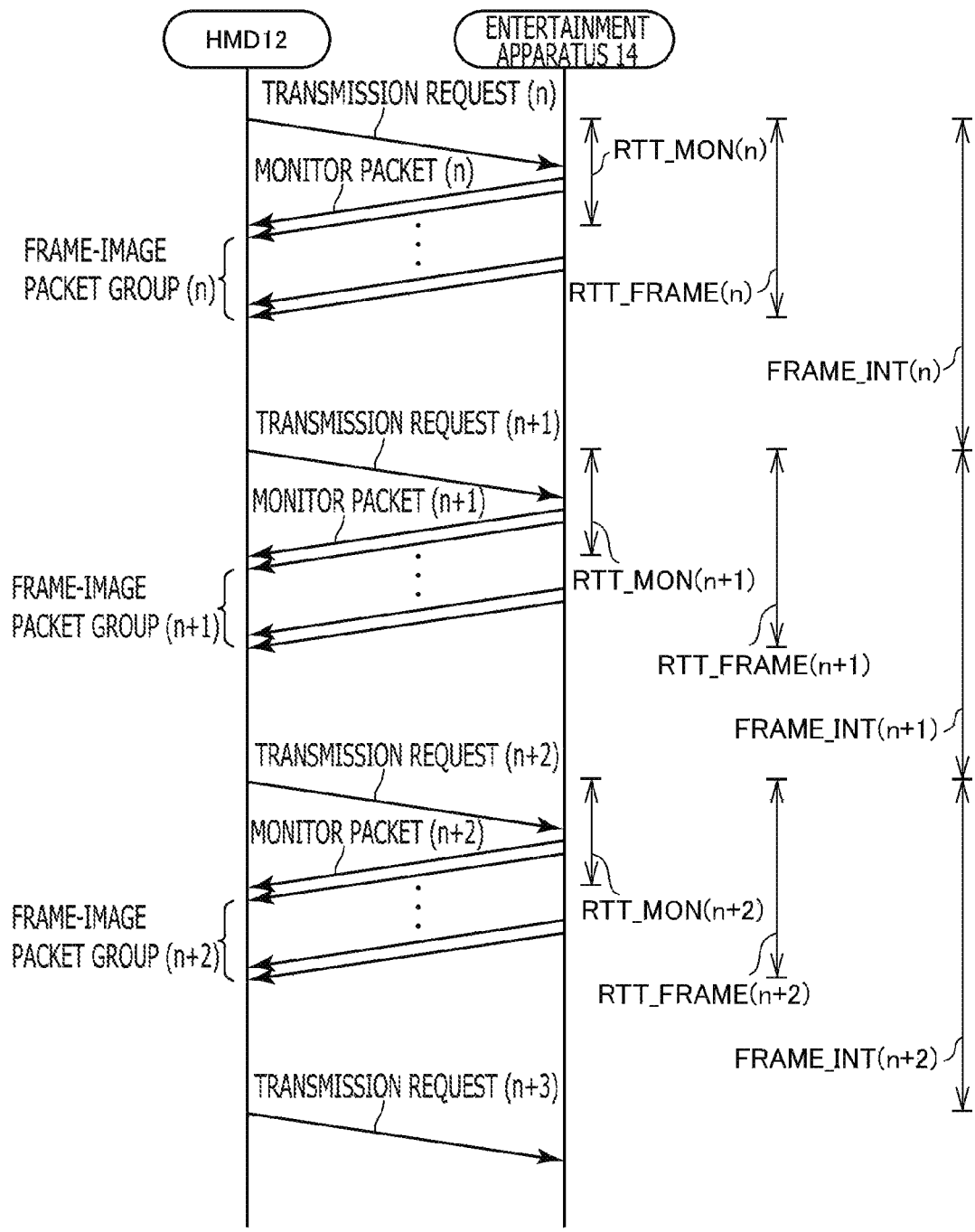
FIG. 3 is a diagram schematically illustrating an example of transmission and reception of a frame image.

FIG. 3 is a diagram schematically illustrating an example of transmission and reception of the frame image. In FIG. 3, an example of transmission and reception of three consecutive frame images from an n-th frame up to an (n+2)-th frame of a series of frame images constituting the play moving image is schematically illustrated. Hereinafter, the n-th, (n+1)-th, and (n+2)-th frame images constituting the play moving image are represented as a frame image (n), a frame image (n+1), and a frame image (n+2), respectively.

For example, the HMD 12 is assumed to transmit the transmission request of the frame image to the entertainment apparatus 14. In accordance with reception of the transmission request, the entertainment apparatus 14 generates and encodes the requested frame image. Then, the entertainment apparatus 14 transmits a monitor packet that is a monitoring packet for monitoring a communication environment and a frame-image packet group that is a packet group of the encoded frame image to the HMD 12.

Here, for example, a transmission request (n), transmission request (n+1), and transmission request (n+2) illustrated in FIG. 3 represent transmission requests of the frame image (n), the frame image (n+1), and the frame image (n+2), respectively. In addition, the monitor packet (n), the monitor packet (n+1), and the monitor packet (n+2) represent monitor packets to be transmitted in accordance with the reception of the transmission request (n), the transmission request (n+1), and the transmission request (n+2), respectively. Further, a frame-image packet group (n), a frame-image packet group (n+1), and a frame-image packet group (n+2) represent packet groups of the frame image (n), the frame image (n+1), and the frame image (n+2), respectively.

In the present embodiment, for example, a time from the transmission of the transmission request of the frame image up to the reception of the monitor packet transmitted in accordance with the transmission request is referred to as a monitor round-trip time of the frame image. In FIG. 3, the monitor round-trip times of the frame image (n), the frame image (n+1), and the frame image (n+2) are represented to be RTT_MON (n), RTT_MON (n+1), and RTT_MON (n+2), respectively.

Further, for example, a time from timing at which the HMD 12 transmits the transmission request of the frame image up to timing at which the HMD 12 receives a final packet belonging to the frame-image packet group of the frame image is referred to as a frame-image round-trip time of the frame image. In FIG. 3, the frame-image round-trip times of the frame image (n), the frame image (n+1), and the frame image (n+2) are represented to be RTT_FRANE (n), RTT_FRANE (n+1), and RTT_FRANE (n+2), respectively.

Further, for example, a time from timing at which the HMD 12 transmits the transmission request of the frame image up to timing at which the HMD 12 transmits the transmission request of the frame image of the next frame is referred to as a frame interval. Further, for example, a time from timing at which the HMD 12 transmits the transmission request of the frame image (n) up to timing at which the HMD 12 transmits the transmission request of the frame image (n+1) is referred to as the frame interval of a frame n. Further, for example, a time from timing at which the HMD 12 transmits the transmission request of the frame image (n+1) up to timing at which the HMD 12 transmits the transmission request of the frame image (n+2) is referred to as the frame interval of a frame (n+1). Further, for example, a time from timing at which the HMD 12 transmits the transmission request of the frame image (n+2) up to timing at which the HMD 12 transmits the transmission request of a frame image (n+3) that is the frame image of the next frame of the frame image (n+2) is referred to as the frame interval of a frame (n+2). In FIG. 3, the frame intervals of the frame n, the frame (n+1), and the frame (n+2) are represented to be FRAME_INT (n), FRAME_INT (n+1), and FRAME_INT (n+2), respectively.

For example, the HMD 12 according to the present embodiment performs control so that a frame image size of a second frame image received after a first frame image corresponds to a time required to receive the first frame image. Here, for example, the frame image (n) corresponds to the first frame image and the frame image (n+2) corresponds to the second frame image. In the present embodiment, the frame image size of the frame image (n+2) is controlled to correspond to the time (e.g., RTT_FRAME (n)) required to receive the frame image (n). In this manner, according to the present embodiment, the frame image size of each frame image can be controlled to transmit the frame image to the HMD 12 at an appropriate timing. Note that the time required to receive the frame image (n) is not limited to RTT_FRAME (n) and, for example, may be a time from timing at which the HMD 12 receives a first packet belonging to the frame-image packet group (n) up to timing at which the HMD 12 receives the final packet.

In addition, in the present embodiment, as described above, the frame image size of the frame image (n+2) is controlled to correspond to RTT_FRAME (n). The reason is that a specification of the frame image size based on RTT_FRAME (n) is assumed to be late for transmission of the transmission request (n+1) in some cases. Therefore, in a case in which there is a margin in such a transmission timing of the transmission request (n+1) or the like, the HMD 12 may perform control so that the frame image size of the frame image (n+1) corresponds to the time required to receive the frame image (n). In this case, the frame image (n) corresponds to the first frame image and the frame image (n+1) corresponds to the second frame image.

Further, in the present embodiment, on the basis of a rotation amount or a movement amount of the HMD 12, which is measured by the sensor section 40, a change amount of a posture or position of the HMD 12 is specified. Further, the frame image size of the received frame image is controlled to correspond to the change amount of the posture or position of the HMD 12.

In addition, in the present embodiment, the frame image size of the received frame image is controlled to correspond to the above-described wireless-physical-layer information output by the communication section 34.

Hereinafter, functions of the video display system 10 according to the present embodiment and processing performed in the video display system 10 according to the present embodiment will be further described.

Figure 4:
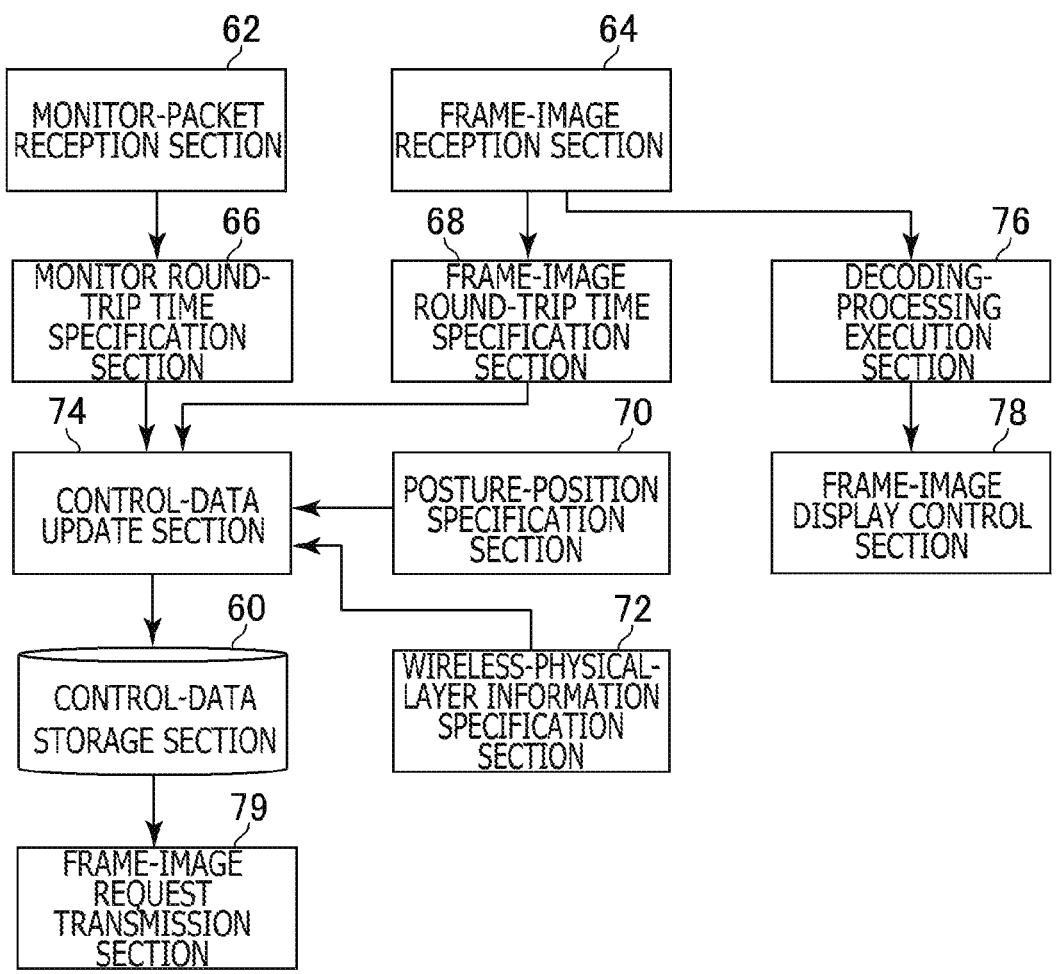
FIG. 4 is a functional block diagram illustrating an example of functions implemented in the head-mounted display according to the embodiment of the present invention.

FIG. 4 is a functional block diagram illustrating an example of functions implemented in the HMD 12 according to the present embodiment. In the HMD 12 according to the present embodiment, all the functions illustrated in FIG. 4 need not be implemented and functions other than the functions illustrated in FIG. 4 may be implemented.

As illustrated in FIG. 4, the HMD 12 according to the present embodiment functionally includes, for example, a control-data storage section 60, a monitor-packet reception section 62, a frame-image reception section 64, a monitor round-trip time specification section 66, a frame-image round-trip time specification section 68, a posture-position specification section 70, a wireless-physical-layer information specification section 72, a control-data update section 74, a decoding-processing execution section 76, a frame-image display control section 78, and a frame-image request transmission section 79. The HMD 12 according to the present embodiment takes a role as a reception apparatus that receives the frame image constituting the moving image.

The control-data storage section 60 is mainly implemented as the storage section 32. The monitor-packet reception section 62, the frame-image reception section 64, and the frame-image request transmission section 79 are mainly implemented as the communication section 34. The monitor round-trip time specification section 66, the frame-image round-trip time specification section 68, and the control-data update section 74 are mainly implemented as the control section 30. The posture-position specification section 70 is mainly implemented as the control section 30 and the sensor section 40. The wireless-physical-layer information specification section 72 is mainly implemented as the control section 30 and the communication section 34. The decoding-processing execution section 76 is mainly implemented as the encoder/decoder section 44. The frame-image display control section 78 is mainly implemented as the control section 30 and the display section 38.

The above functions may be implemented by executing, by the control section 30, a program including commands corresponding to the above functions, which is installed in the HMD 12 that is a computer. This program may be supplied to the HMD 12 via a computer readable information storage medium such as an optical disk, a magnetic disk, a magnetic tape, a magnetic optical disk, or a flash memory, or via the Internet etc.

Figure 5:
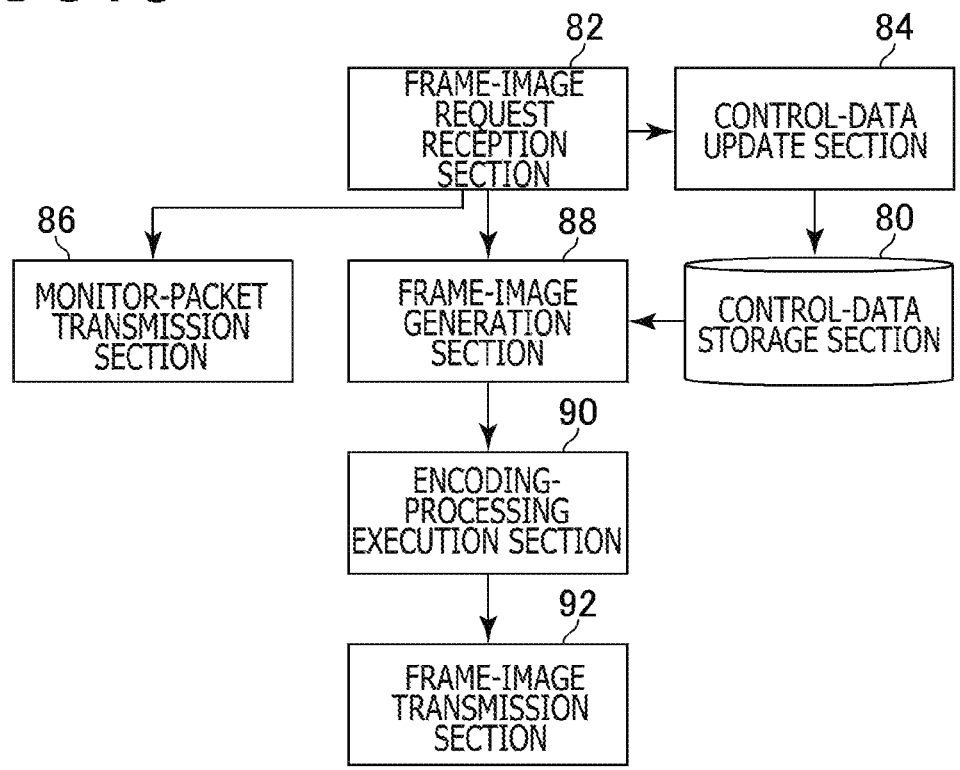
FIG. 5 is a functional block diagram illustrating an example of functions implemented in the entertainment apparatus according to the embodiment of the present invention.

FIG. 5 is a functional block diagram illustrating an example of functions implemented in the entertainment apparatus 14 according to the present embodiment. In addition, in the entertainment apparatus 14 according to the present embodiment, all the functions illustrated in FIG. 5 need not be implemented and functions other than the functions illustrated in FIG. 5 may be implemented.

As illustrated in FIG. 5, the entertainment apparatus 14 according to the present embodiment functionally includes, for example, a control-data storage section 80, a frame-image request reception section 82, a control-data update section 84, a monitor-packet transmission section 86, a frame-image generation section 88, an encoding-processing execution section 90, and a frame-image transmission section 92. The entertainment apparatus 14 according to the present embodiment takes a role as a transmission apparatus that transmits the frame image constituting the moving image.

The control-data storage section 80 is mainly implemented as the storage section 52. The frame-image request reception section 82, the monitor-packet transmission section 86, and the frame-image transmission section 92 are mainly implemented as the communication section 54 or the input/output section 56. The control-data update section 84 and the frame-image generation section 88 are mainly implemented as the control section 50. The encoding-processing execution section 90 is mainly implemented as the encoder/decoder section 58.

The above functions may be implemented by executing, by the control section 50, a program including commands corresponding to the above functions, which is installed in the entertainment apparatus 14 that is a computer. This program may be supplied to the entertainment apparatus 14 via a computer readable information storage medium such as an optical disk, a magnetic disk, a magnetic tape, a magnetic optical disk, or a flash memory, or via the Internet etc.

In the present embodiment, for example, the control-data storage section 60 stores control data for controlling an attribute of the frame image, such as the frame image size of the frame image transmitted from the entertainment apparatus 14. In the present embodiment, for example, the control-data storage section 60 stores frame-image size data indicating the frame image size of the frame image. In addition, in the present embodiment, it is assumed that as a value of the frame-image size data is larger, the frame image size of the frame image is controlled to become larger.

In the present embodiment, for example, the monitor-packet reception section 62 receives the above-described monitor packet from the entertainment apparatus 14 via the relay apparatus 16.

In the present embodiment, for example, the frame-image reception section 64 receives the above-described frame-image packet group from the entertainment apparatus 14 via the relay apparatus 16.

In the present embodiment, for example, the monitor round-trip time specification section 66 specifies the above-described monitor round-trip time. In accordance with the reception of the monitor packet (n), for example, RTT_MON (n) is specified.

In the present embodiment, for example, the frame-image round-trip time specification section 68 specifies the above-described frame-image round-trip time. In accordance with the reception of the final packet of the frame-image packet group (n), for example, RTT_FRAME (n) is specified.

In the present embodiment, for example, on the basis of measurement results of the sensor section 40, the posture-position specification section 70 specifies at least one of a posture and position of the HMD 12 at a predetermined sampling rate.

In the present embodiment, for example, the wireless-physical-layer information specification section 72 specifies a value indicated by the above-described wireless-physical-layer information at a predetermined sampling rate. Here, for example, a value of the received signal strength (RSSI), a value of the signal noise ratio (SNR), a value of the modulation coding scheme, a value of the beacon transmission/reception period, or the like is specified.

In the present embodiment, for example, the control-data update section 74 updates a value of the frame-image size data stored in the control-data storage section 60 on the basis of the frame-image round-trip time specified by the frame-image round-trip time specification section 68. The control-data update section 74 may update a value of the frame-image size data stored in the control-data storage section 60 on the basis of the monitor round-trip time specified by the monitor round-trip time specification section 66. For example, when RTT_MON (n+1) is specified after receiving the monitor packet (n+1), the control-data update section 74 according to the present embodiment updates a value of the frame-image size data on the basis of a value of RTT_FRAME (n) and a value of RTT_MON (n+1). In this manner, the control-data update section 74 according to the present embodiment takes a role as a frame-image size control section that performs control so that the frame image size of the second frame image received after the first frame image corresponds to the time required to receive the first frame image.

Further, in the present embodiment, for example, the control-data update section 74 specifies the change amount of the posture or position of the HMD 12 on the basis of at least one of the posture and position of the HMD 12 specified by the posture-position specification section 70. Then, the control-data update section 74 updates a value of the frame-image size data stored in the control-data storage section 60 on the basis of the change amount of the posture or position of the specified HMD 12.

Further, in the present embodiment, for example, the control-data update section 74 updates a value of the frame-image size data stored in the control-data storage section 60 on the basis of a value indicated by the wireless-physical-layer information specified by the wireless-physical-layer information specification section 72.

In the present embodiment, for example, the decoding-processing execution section 76 performs decoding processing on the received frame-image packet group and generates an image to be displayed.

In the present embodiment, for example, the frame-image display control section 78 allows the display section 38 to display an image after the decoding by the decoding-processing execution section 76.

In the present embodiment, for example, in accordance with the reception of the frame-image packet group, the frame-image request transmission section 79 transmits the transmission request of the frame image of the next frame to the entertainment apparatus 14 via the relay apparatus 16. In the present embodiment, in the transmission request transmitted by the frame-image request transmission section 79, a frame sequence number that is an identifier of the frame image transmitted in accordance with the transmission request and the frame-image size data are included. To a value of the frame image size included in the transmission request, for example, a value of the frame image size stored in the control-data storage section 60 is set.

Further, in the present embodiment, the frame-image request transmission section 79 holds frame interval data indicating the above-described frame interval. In the initial condition, for example, 1/120 second is set to a value of the frame interval data. Then, in the present embodiment, the frame-image request transmission section 79 transmits the transmission request of the frame image in the frame interval indicated by a value of the frame interval data. FRAME_INT (n), FRAME_INT (n+1), and FRAME_INT (n+2) illustrated in FIG. 3 correspond to values of the frame interval data held by the frame-image request transmission section 79.

In the present embodiment, for example, the control-data storage section 80 stores the above-described control data. In the present embodiment, for example, the control-data storage section 80 stores the frame-image size data indicating the frame image size of the frame image.

In the present embodiment, for example, the frame-image request reception section 82 receives the transmission request of the frame image transmitted from the HMD 12 via the relay apparatus 16. In the transmission request, the frame-image size data is included as described above. In this manner, the frame-image request reception section 82 according to the present embodiment receives designation of the frame image size corresponding to the time required to receive the transmitted frame image from the HMD 12.

The control-data update section 84 updates a value of the frame-image size data stored in the control-data storage section 80 on the basis of the frame-image size data included in the transmission request received by the frame-image request reception section 82.

In the present embodiment, for example, the monitor-packet transmission section 86 transmits the above-described monitor packet. Examples of the monitor packet include the above-described frame sequence number and data indicating the value of the frame-image size data after the updating.

In the present embodiment, for example, the frame-image generation section 88 generates the frame image distinguished by the frame sequence number included in the transmission request received by the frame-image request reception section 82. Here, in the present embodiment, the frame-image generation section 88 generates the frame image so as to have the frame image size indicated by the frame-image size data stored in the control-data storage section 80.

In the present embodiment, for example, the encoding-processing execution section 90 performs processing for encoding the frame image generated by the frame-image generation section 88.

In the present embodiment, for example, in accordance with the reception of the designation of the frame image size, the frame-image transmission section 92 transmits to the HMD 12 the frame image in which the frame image size corresponds to the designation. In the present embodiment, for example, the frame-image transmission section 92 transmits the frame image encoded by the encoding-processing execution section 90 to the HMD 12 via the relay apparatus 16. In the present embodiment, for example, the frame-image transmission section 92 transmits the frame-image packet group that corresponds to the encoded frame image.

Figure 6:
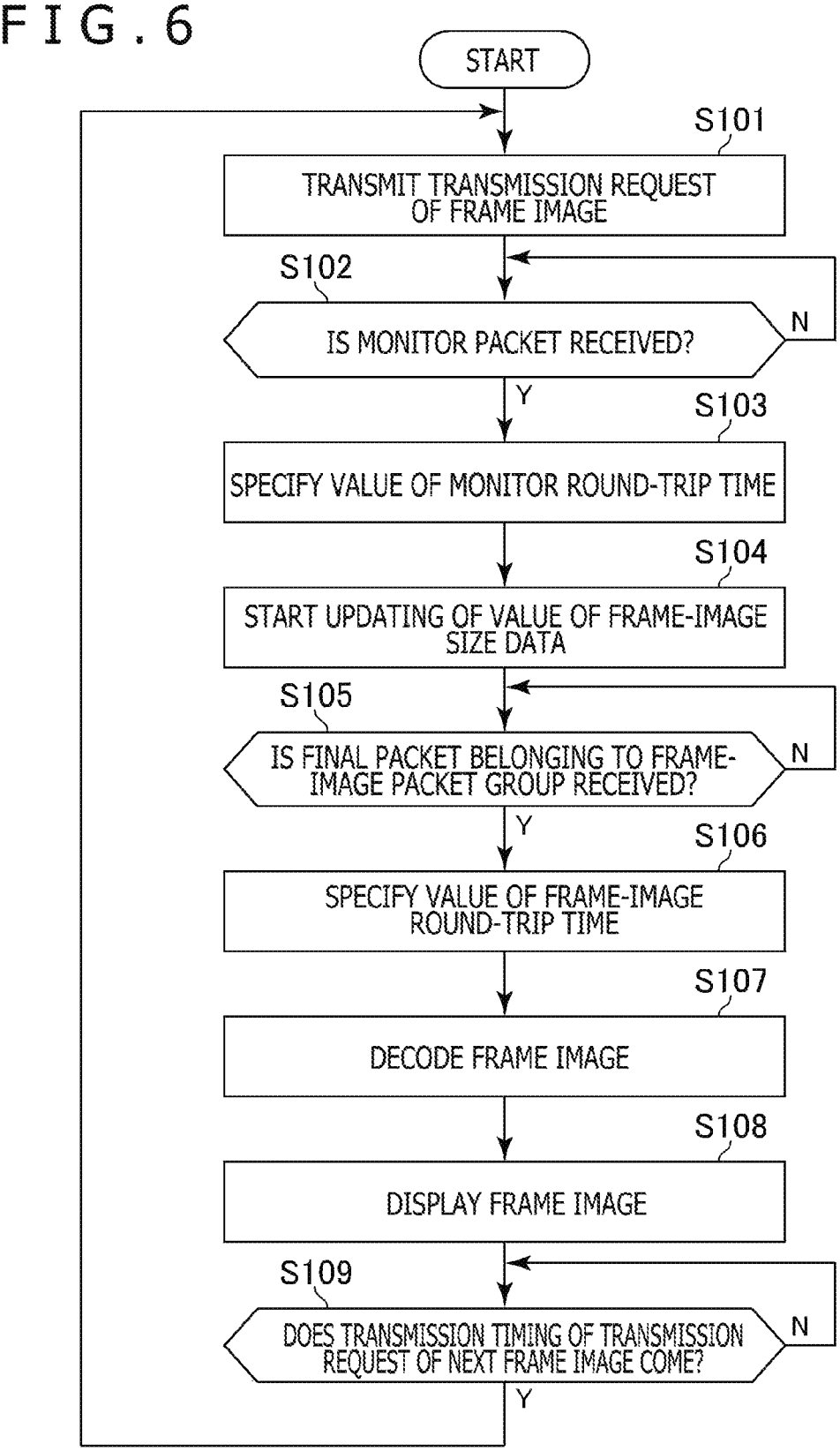
FIG. 6 is a flowchart illustrating an example of a stream of processing performed in the head-mounted display according to the embodiment of the present invention.

Hereinafter, an example of a stream of processing from the transmission of the transmission request up to the reception of the frame-image packet group, which is performed in the HMD 12 according to the present embodiment, will be described with reference to a flowchart illustrated in FIG. 6.

First, the frame-image request transmission section 79 transmits the transmission request of the frame image to the entertainment apparatus 14 (S101). In the transmission request, the frame-image size data stored in the control-data storage section 60 is included.

Then, stand by until the monitor-packet reception section 62 receives the monitor packet (S102).

When the monitor-packet reception section 62 receives the monitor packet, the monitor round-trip time specification section 66 specifies a value of the monitor round-trip time (S103).

Then, the control-data update section 74 starts to update a value of the frame-image size data stored in the control-data storage section 60 (S104). Here, for example, a value of the frame-image size data stored in the control-data storage section 60 is updated on the basis of a value of the frame-image round-trip time of a precedent frame and a value of the monitor round-trip time specified in the process indicated in S103.

Then, stand by until the frame-image reception section 64 receives the final packet belonging to the frame-image packet group (S105).

When the frame-image reception section 64 receives the final packet belonging to the frame-image packet group, the frame-image round-trip time specification section 68 specifies a value of the frame-image round-trip time of the frame (S106).

Then, the decoding-processing execution section 76 decodes the frame image corresponding to the received frame-image packet group (S107).

Then, the frame-image display control section 78 allows the display section 38 to display the frame image decoded in the process indicated in S107 (S108).

Then, the frame-image request transmission section 79 stands by until the transmission timing of the transmission request of the next frame image comes (S109). Here, for example, the frame-image request transmission section 79 stands by until a time indicated by a value of the held frame interval data from a time of the transmission of the transmission request in the process indicated in S101.

Then, when the transmission timing of the transmission request of the next frame image comes, the processes indicated in S101 and subsequent steps of the next frame are performed.

As described above, in the present embodiment, whenever receiving the frame image, the HMD 12 performs control so that the frame image size of the frame image received after the frame image corresponds to the time required to receive the frame image. This process permits the frame image size to be controlled in units of the frame image. Further, in an ideal environment, communication by half-duplex communication is performed between the HMD 12 and the entertainment apparatus 14.

Figure 7A:
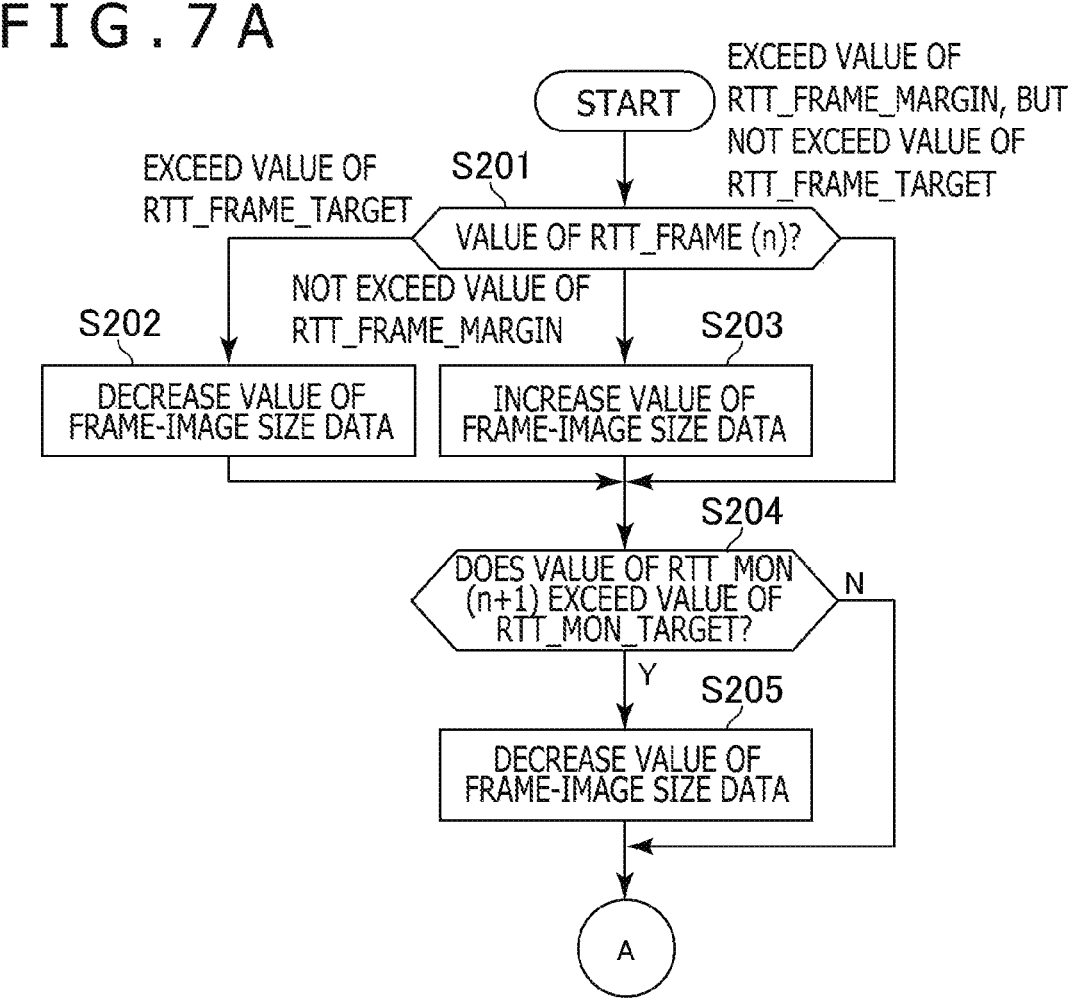
FIG. 7A is a flowchart illustrating an example of a stream of the processing performed in the head-mounted display according to the embodiment of the present invention.
Figure 7B:
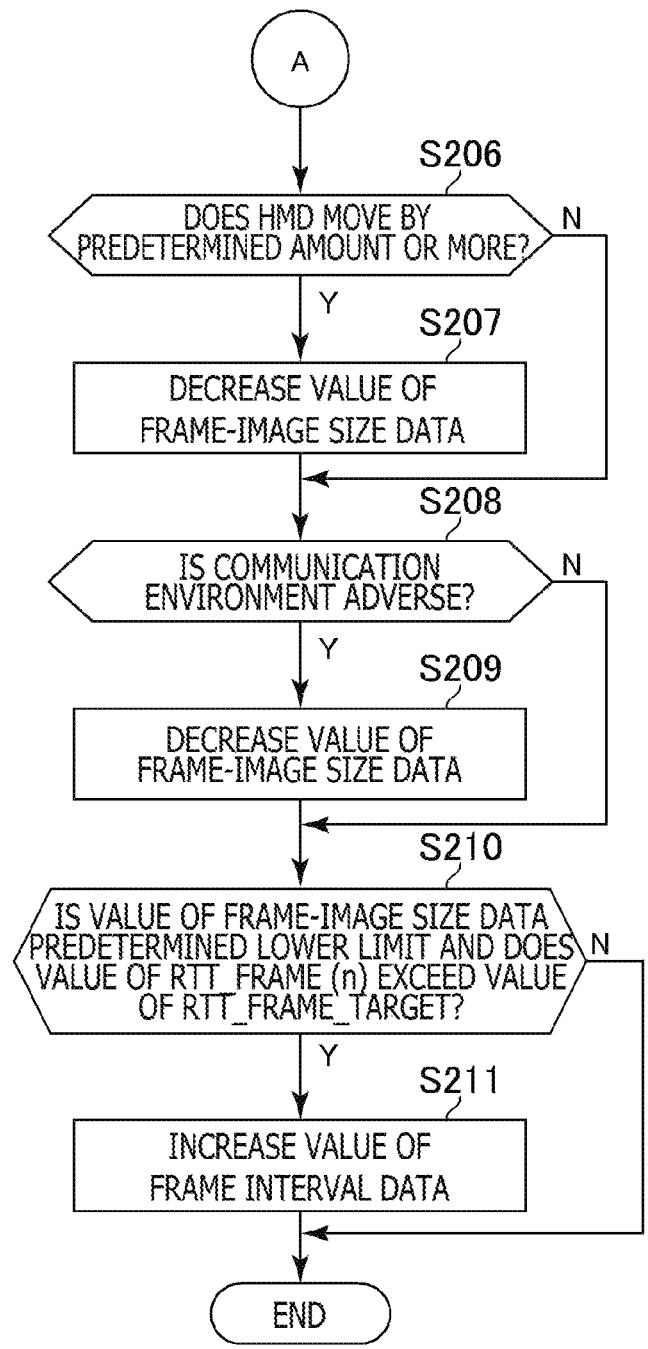
FIG. 7B is a flowchart illustrating an example of a stream of the processing performed in the head-mounted display according to the embodiment of the present invention.

Next, an example of a stream of updating processing of a value of the frame-image size data stored in the control-data storage section 60, which is started in the process indicated in the above-described S104, will be described with reference to a flowchart illustrated in FIG. 7A and FIG. 7B. Note that in here, a case in which the transmission request (n+1) is transmitted in the process indicated in the above-described S101 will be described. Meanwhile, the processes indicated in FIG. 7A and FIG. 7B may be performed asynchronously with those illustrated in FIG. 6.

First, the control-data update section 74 confirms, for example, a value of RTT_FRAME (n) (S201).

Here, it is provisionally confirmed that a value of RTT_FRAME (n) exceeds a value indicating a predetermined target time (hereinafter, referred to as RTT_FRAME_TARGET) with regard to the frame-image round-trip time. In this case, the control-data update section 74 decreases a value of the frame-image size data stored in the control-data storage section 60 (S202). Here, for example, a value of the frame-image size data may be decreased by a value obtained by multiplying a difference between a value of RTT_FRAME (n) and a value of RTT_FRAME_TARGET by a predetermined coefficient. In addition, as an example of a value of RTT_FRAME_TARGET, 4 milliseconds are included.

It is provisionally confirmed that a value of RTT_FRAME (n) does not exceed a value indicating a predetermined time (hereinafter, referred to as RTT_FRAME_MARGIN) shorter than RTT_FRAME_TARGET. In this case, the control-data update section 74 increases a value of the frame-image size data stored in the control-data storage section 60 (S203). Here, for example, a value of the frame-image size data may be increased by a value obtained by multiplying a difference between a value of RTT_FRAME_MARGIN and a value of RTT_FRAME (n) by a predetermined coefficient. In addition, as an example of a value of RTT_FRAME_MARGIN, three milliseconds are included.

As described above, in the present embodiment, the time required to receive the frame image (n) may exceed the target time. In this case, in the present embodiment, the control-data update section 74 performs control so that the frame image size of the frame image (n+2) becomes smaller than the frame image size of the frame image (n). Through this process, when the time required to receive the frame image (n) exceeds the target time, the frame image size of the frame image is controlled so that the frame image is transmitted to the HMD 12 without being late for the predetermined display timing.

In the present embodiment, the time required to receive the frame image (n) may not exceed the above-described predetermined time. In this case, the control-data update section 74 performs control so that the frame image size of the frame image (n+2) becomes larger than the frame image size of the frame image (n). Through this process, when there is a margin in the time required to receive the frame image, the frame image size of the transmitted frame image is controlled to become larger as far as possible.

If a value of RTT_FRAME (n) exceeds a value of RTT_FRAME_MARGIN but does not exceed a value of RTT_FRAME_TARGET, the process proceeds to S204.

Then, the control-data update section 74 confirms whether or not RTT_MON (n+1) exceeds a value indicating a predetermined target time (hereinafter, referred to as RTT_MON_TARGET) with regard to the monitor round-trip time (S204).

If a value of RTT_MON (n+1) exceeds a value of RTT_MON_TARGET (S204: Y), the control-data update section 74 decreases a value of the frame-image size data stored in the control-data storage section 60 (S205). Here, for example, a value of the frame-image size data may be decreased by a predetermined value. Alternatively, a value of the frame-image size data may be multiplied by a predetermined scale factor (e.g., 80% or the like) smaller than one.

As described above, in the present embodiment, the frame image size of the frame image (n+2), which is received after the frame image (n+1), is controlled to correspond to the time required to receive the frame image (n) and a value of RTT_MON (n+1). In addition, in the present embodiment, after a value of the frame-image size data is adjusted, a value of the frame-image size data is further updated by a value of RTT_MON (n+1). Through this process, even if the time required to receive the frame image (n) is short, in a case in which the time required to receive the monitor packet (n+1) is long, the above fact can be reflected on the frame image size of the frame image (n+2).

Then, on the basis of at least one of the posture and position of the HMD 12 specified by the posture-position specification section 70, the control-data update section 74 determines whether or not the HMD 12 moves by a predetermined amount or more (S206). Even if it is confirmed that a value of RTT_MON (n+1) does not exceed a value of RTT_MON_TARGET in the process indicated in S204 (S204: N), the process indicated in S206 is performed. Here, for example, if the movement amount or the rotation amount in a previous predetermined time exceeds the predetermined amount, it may be determined that the HMD 12 moves by the predetermined amount or more.

Then, if it is determined that the HMD 12 moves by the predetermined amount or more (S206: Y), the control-data update section 74 decreases a value of the frame-image size data stored in the control-data storage section 60 (S207). Here, for example, a value of the frame-image size data may be decreased by the predetermined value. Alternatively, a value of the frame-image size data may be multiplied by the predetermined scale factor (e.g., 80% or the like) smaller than one.

Then, on the basis of a value regarding the wireless-physical-layer information specified by the wireless-physical-layer information specification section 72, the control-data update section 74 determines whether or not a communication environment of communication through the HMD 12 is adverse (S208). Even if it is not determined that the HMD 12 moves by the predetermined amount or more in the process indicated in S206 (S206: N), the process indicated in S208 is performed. Here, for example, if a value of the received signal strength is a predetermined value or less or if a value of the signal noise ratio is a predetermined value or less, it may be determined that the communication environment of the communication through the HMD 12 is adverse. Further, for example, if a maximum data rate made correspondent to the modulation coding scheme used for communication is a predetermined value or less, it may be determined that the communication environment of the communication through the HMD 12 is adverse.

Then, if it is determined that the communication environment of the communication through the HMD 12 is adverse (S208: Y), the control-data update section 74 decreases a value of the frame-image size data stored in the control-data storage section 60 (S209). Here, for example, a value of the frame-image size data may be decreased by the predetermined value. Alternatively, a value of the frame-image size data may be multiplied by the predetermined scale factor (e.g., 80% or the like) smaller than one.

Then, the control-data update section 74 confirms whether or not a value of the frame-image size data is a predetermined lower limit and a value of RTT_FRAME (n) exceeds a value of RTT_FRAME_TARGET (S210). Even if it is not determined that the communication environment of the communication through the HMD 12 is adverse in the process indicated in S208 (S208: N), the process indicated in S210 is performed.

If a value of the frame-image size data is not the predetermined lower limit or a value of RTT_FRAME (n) does not exceed a value of RTT_FRAME_TARGET (S210: N), the processing indicated in this processing example is ended.

If a value of the frame-image size data is the predetermined lower limit and a value of RTT_FRAME (n) exceeds a value of RTT_FRAME_TARGET (S210: Y), the control-data update section 74 increases a value of the frame interval data held by the frame-image request transmission section 79 (S211). Here, for example, a value of the frame interval data may be changed to 1/60 second that is doubled. In this case, a subsequent frame interval is 1/60 second. In addition, in the process indicated in S211, if a value of the frame-image size data is less than the predetermined lower limit, the control-data update section 74 may update a value of the frame-image size data to the predetermined lower limit. Through this process, a value of the frame-image size data is controlled not to be less than the predetermined lower limit.

As described above, in the present embodiment, the frame image size of the frame image (n) may be the predetermined lower limit and the time required to receive the frame image (n) may exceed the target time. In the present embodiment, in such a case, the control-data update section 74 performs control so that a frame rate at which the frame image received after the frame image (n) is transmitted becomes small. Here, for example, a frame rate at which the frame images of the frame image (n+2) and after are transmitted is controlled to become small. Through this process, in a case in which the frame image is not transmitted to the HMD 12 at an appropriate timing even if the frame image size is the predetermined lower limit, uncomfortable feeling of a player in an operation can be reduced by lowering the frame rate.

Then, the processing indicated in this processing example is ended.

A value of the frame interval data held by the frame-image request transmission section 79 is assumed to be changed as indicated in the above-described S211. In this case, for example, in accordance with a value of the frame interval data after the updating, a value of RTT_FRAME_TARGET or a value of RTT_FRAME_MARGIN may be changed. For example, in a case in which a value of the frame interval data is doubled, a value of RTT_FRAME_TARGET and a value of RTT_FRAME_MARGIN may be doubled.

Further, for example, when a value of the frame-image round-trip time is less than a value (e.g., three milliseconds) of RTT_FRAME_MARGIN in the initial condition, a value of the frame interval data held by the frame-image request transmission section 79 may be decreased (e.g., divided into halves). In this case, a subsequent frame interval returns to 1/120 second.

Meanwhile, it is assumed that the frame-image reception section 64 does not receive all the frame-image packet group (n+1). In this case, the control-data update section 74 may decrease a value of the frame-image size data stored in the control-data storage section 60 by the predetermined value. Alternatively, in this case, the control-data update section 74 may multiply a value of the frame-image size data by the predetermined scale factor (e.g., 80% or the like) smaller than one.

Meanwhile, for example, it is assumed that the frame-image reception section 64 receives the final packet of the frame-image packet group (n) after the transmission timing of the transmission request (n+1). In this case, the control-data update section 74 may decrease a value of the frame-image size data by a predetermined value. Alternatively, in this case, the control-data update section 74 may multiply a value of the frame-image size data by the predetermined scale factor (e.g., 80% or the like) smaller than one.

Further, for example, it is assumed that the frame-image reception section 64 receives the final packet of the frame-image packet group (n) after the transmission timing of the transmission request (n+1). In this case, the control-data update section 74 may decrease a value of the frame-image size data by the predetermined value. Alternatively, in this case, the control-data update section 74 may multiply a value of the frame-image size data by the predetermined scale factor (e.g., 80% or the like) smaller than one.

Further, for example, it is assumed that the frame-image reception section 64 receives the final packet of the frame-image packet group (n) after a reception timing of the monitor packet (n+1). In this case, the control-data update section 74 may decrease a value of the frame-image size data by the predetermined value. Alternatively, in this case, the control-data update section 74 may multiply a value of the frame-image size data by the predetermined scale factor (e.g., 80% or the like) smaller than one. In addition, in this case, the control-data update section 74 may further decrease a value of the frame-image size data even with regard to the next frame.

Further, for example, when the frame-image reception section 64 does not receive the monitor packet (n+1), the control-data update section 74 may decrease a value of the frame-image size data by the predetermined value. Alternatively, the control-data update section 74 may multiply a value of the frame-image size data by the predetermined scale factor (e.g., 80% or the like) smaller than one.

Figure 8:
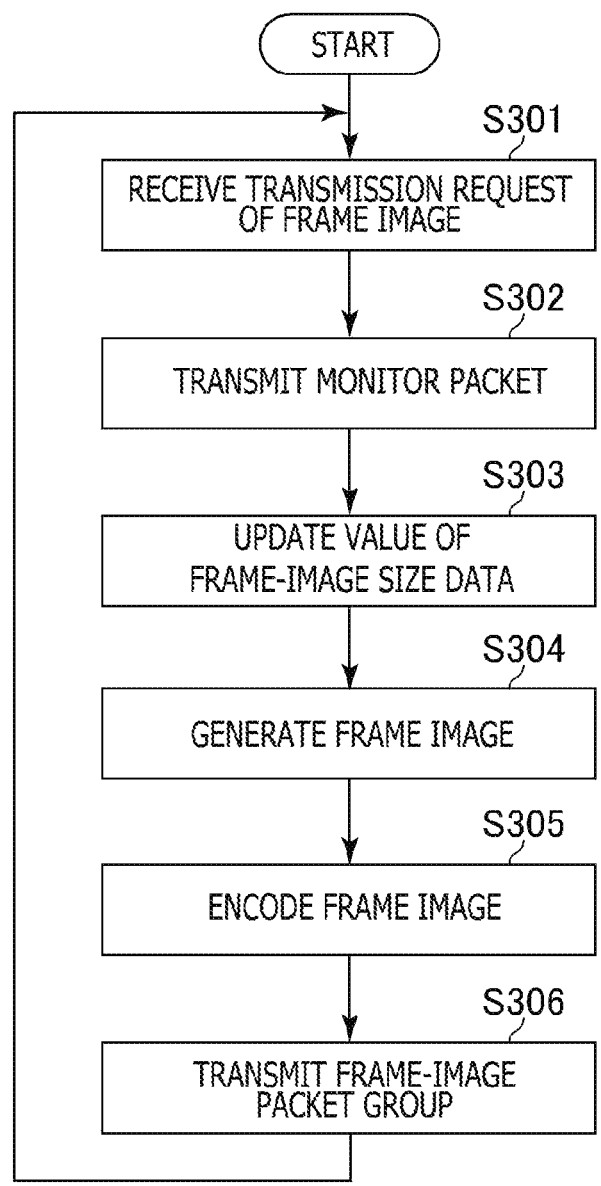
FIG. 8 is a flowchart illustrating an example of a stream of processing performed in the entertainment apparatus according to the embodiment of the present invention.

Next, an example of a stream of the processing from the reception of the transmission request up to the transmission of the frame-image packet group, which is performed in the entertainment apparatus 14 according to the present embodiment, will be described with reference to a flowchart illustrated in FIG. 8.

First, the frame-image request reception section 82 receives the transmission request of the frame image from the HMD 12 (S301).

Then, the monitor-packet transmission section 86 transmits the monitor packet to the HMD 12 (S302).

Then, the control-data update section 84 updates a value of the frame-image size data stored in the control-data storage section 80 to a value of the frame-image size data included in the transmission request received in the process indicated in S301 (S303).

Then, the frame-image generation section 88 generates the frame image so as to have the frame image size indicated by the frame-image size data stored in the control-data storage section 80 (S304).

Then, the encoding-processing execution section 90 encodes the frame image generated in the process indicated in S304 (S305).

Then, the frame-image transmission section 92 transmits the frame-image packet group obtained by dividing the frame image encoded in the process indicated in S305 into a plurality of packets to the HMD 12 (S306). Then, the process returns to S301.

As described above, in accordance with the reception of the transmission request of the frame image, the entertainment apparatus 14 according to the present embodiment transmits two types of packets different from each other, such as the monitor packet and the frame-image packet group to the HMD 12. Then, the frame image size of the frame image is controlled on the basis of the reception timing of plural types of packets different from each other.

As described above, an example in which the frame image size of the frame image is controlled in accordance with the time required to receive the frame image is described. Further, the example to be controlled in accordance with the time required to receive the frame image is not limited to the frame image size.

For example, an encoding scheme of the frame image may be controlled in accordance with the time required to receive the frame image.

Concretely, for example, the control-data storage section 60 or the control-data storage section 80 may store encoding scheme data indicating the encoding scheme of the frame image. The encoding scheme data may indicate, for example, a group of picture (GOP) and a codec type (h.264, h.265, a joint photographic experts group (JPEG), RAW, or the like).

Further, in the transmission request of the frame image, the encoding scheme data may be included. Then, the frame-image generation section 88 may encode the frame image in accordance with a scheme indicated by the encoding scheme data included in the transmission request. Similarly to the frame image size, for example, the control-data update section 74 may update a value of the encoding scheme data stored in the control-data storage section 60 on the basis of a value of RTT_FRAME (n) and a value of RTT_MON (n+1). In addition, the control-data update section 84 may update a value of the encoding scheme data stored in the control-data storage section 80 on the basis of a value of the encoding scheme data included in the received transmission request. As described above, the encoding scheme of the frame image (n+2) may be controlled to correspond to RTT_FRAME (n) and RTT_MON (n+1).

For example, when a value of a frame-image response time or a value of a monitor response time is smaller than a predetermined value, a value of the encoding scheme data may be set to a value indicating the encoding scheme including an I frame and a P frame so as to have a large amount of information. In this case, the frame image may be encoded to include the I frame and the P frame. Further, for example, when a value of the frame-image response time or a value of the monitor response time is smaller than the predetermined value, a value of the encoding scheme data may be set to a value indicating the encoding scheme including only the I frame so as to have a small amount of information. In this case, the frame image may be encoded to include only the I frame.

In addition, for example, the monitor-packet transmission section 86 may transmit the monitor packet including buffer control data indicating the number of buffers, a buffer size, a buffer operation, and the like to the HMD 12. Then, on the basis of the buffer control data, the HMD 12 may set a buffer of the frame image to the storage section 32.

Further, for example, the frame-image transmission section 92 may transmit the frame image to the HMD 12 via a first communication path and transmit a copy of the frame image to the HMD 12 via a second communication path. Then, the frame-image reception section 64 may receive the frame image via the first communication path and receive the copy of the frame image via the second communication path.

Here, the first communication path and the second communication path may be different in a frequency band from each other. For example, the frequency band of the first communication path may be 60 GHz band and that of the second communication path may be 5 GHz band.

Then, the frame-image round-trip time specification section 68 may specify the time required to receive the frame image or the copy of the frame image that is received earlier. The frame-image round-trip time specification section 68 may specify, for example, a time t1 from timing of transmitting the transmission request (n) up to timing of receiving the final packet belonging to the packet group of the frame image (n). Further, the frame-image round-trip time specification section 68 may specify, for example, a time t2 from timing of transmitting the transmission request (n) up to timing of receiving the final packet belonging to the packet group of the copy of the frame image (n). Then, the frame-image round-trip time specification section 68 may specify, as the frame-image round-trip time, the time that is shorter between the time t1 and the time t2.

Meanwhile, the frame-image round-trip time specification section 68 holds the latest frame sequence number. When receiving the frame image or a copy of the frame image of a frame having the frame sequence number or more, the frame-image round-trip time specification section 68 may increase the latest frame sequence number by 1. Further, the frame-image round-trip time specification section 68 may break the frame image or a copy of the frame image of a frame having a number less than the latest frame sequence number.

Then, as described above, the frame image size of the frame image (n+2) may be controlled to have the frame image size in accordance with the frame-image round-trip time specified in this manner. In this case, there is controlled the frame image size of the frame image (n+2) and a copy of the frame image (n+2) transmitted via any one of the first communication path and the second communication path. Through this process, when the frame image or the copy of the frame image is transmitted via a plurality of communication paths, the frame image size of the frame image is controlled to have the frame image size in accordance with the frame image or the copy of the frame image that is received earlier. Note that in this case, the transmission request (n+2) may be transmitted via the first communication path or the second communication path.

Further, whenever receiving the frame image, the HMD 12 need not perform control so that the frame image size of the frame image received after the frame image corresponds to the time required to receive the frame image. For example, whenever receiving a predetermined number of frame images (e.g., three frame images), the HMD 12 may perform control so that the frame image size of the frame image received after the predetermined number of frame images corresponds to the time required to receive the predetermined number of frame images.

Note that the present invention is not limited to the above-described embodiment.

For example, a value of the frame-image size data included in the transmission request of the frame image transmitted by the frame-image request transmission section 79 need not indicate the frame image size itself of the frame image. A value of the frame-image size data included in the transmission request of the frame image may indicate, for example, a difference between the above frame image size and the frame image size of the frame image of the previous frame. Further, for example, a value of the frame-image size data may be indicated at a bit rate. Then, the entertainment apparatus 14 may generate the frame image having the frame image size corresponding to a bit rate indicated by the frame-image size data and transmit the frame image to the HMD 12.

Further, for example, encoding or decoding of data of content may be performed by software.

In addition, the present invention is applicable to even a case in which the HMD 12 and the entertainment apparatus 14 communicate with each other by wire or wirelessly.

Further, the above-described specific character strings or values and specific character strings or values in the drawings are illustrative and not limited to these character strings or values.

The invention claimed is:

1. A reception apparatus comprising:
a reception section configured to receive a first frame image constituting a moving image, the first frame image having a first frame image size; and
a frame-image size control section configured to perform control so that a frame image size of a second frame image constituting the moving image, which is received after the first frame image, corresponds to a time required to receive the first frame image; wherein
the reception section receives the first frame image via a first communication path,
the reception section receives a copy of the first frame image via a second communication path different in a frequency band from the first communication path, and
the frame-image size control section performs control so that the second frame image received via one of the first communication path and the second communication path and a frame image size of a copy of the second frame image received via another communication path correspond to the time required to receive the frame image or the copy of the frame image that is received earlier.

2. The reception apparatus according to claim 1, wherein when the time required to receive the first frame image exceeds a target time, the frame-image size control section performs control so that the frame image size of the second frame image becomes smaller than the frame image size of the first frame image.

3. The reception apparatus according to claim 2, wherein when the frame image size of the first frame image is a predetermined lower limit and the time required to receive the first frame image exceeds the target time, the frame-image size control section performs control so that a frame rate at which a frame image constituting the moving image is transmitted, which is received after the first frame image, becomes small.

4. The reception apparatus according to claim 1, wherein when the time required to receive the first frame image does not exceed a predetermined time shorter than the target time, the frame-image size control section performs control so that the frame image size of the second frame image becomes larger than the frame image size of the first frame image.

5. The reception apparatus according to claim 1, wherein the frame-image size control section performs control so that the frame image size of the second frame image, which is received after a next frame image of the first frame image, corresponds to the time required to receive the first frame image and a time from transmission of a transmission request of the next frame image of the first frame image up to reception of a monitor packet transmitted in accordance with the transmission request.

6. The reception apparatus according to claim 1, wherein whenever receiving the frame image constituting the moving image, the frame-image size control section performs control so that a frame image size of the frame image constituting the moving image, which is received after the frame image, corresponds to the time required to receive the frame image.

7. The reception apparatus according to claim 1, wherein:
when said control is performed, a value of the first frame image size is decreased, to establish a value of the second frame image size, by multiplying the value of the first frame image size by a predetermined scale factor smaller than 1.

8. The reception apparatus according to claim 1, further comprising a head mounted display, wherein the frame-image size control section performs control so that the frame image size of the second frame image constituting the moving image corresponds to a change amount of a posture or position of the head mounted display.

9. The reception apparatus according to claim 1, wherein the frame-image size control section performs control so that the frame image size of the second frame image constituting the moving image corresponds to wireless-physical-layer information regarding communication through the reception apparatus.

10. A transmission apparatus comprising:
a transmission section configured to transmit a first frame image constituting a moving image to a reception apparatus, the first frame image having a first frame image size; and
a reception section configured to receive designation of the first frame image size in accordance with a time required to receive the first frame image from the reception apparatus, wherein
in accordance with reception of the designation, the transmission section transmits a second frame image constituting the moving image, the second frame image having a second frame image size, in which the second frame image size corresponds to the designation, to the reception apparatus;
the transmission section transmits the first frame image via a first communication path; and
the transmission section transmits a copy of the first frame image via a second communication path different in a frequency band from the first communication path,
wherein the second frame image received by a reception apparatus via one of the first communication path and the second communication path and a frame image size of a copy of the second frame image received by the reception apparatus via another communication path correspond to the time required to receive the frame image or the copy of the frame image that is received earlier.

11. A control method comprising:
receiving a first frame image constituting a moving image, the first frame image having a first frame image size; and
performing control so that a frame image size of a second frame image constituting the moving image, which is received after the first frame image, corresponds to a time required to receive the first frame image; wherein
the receiving includes receiving the first frame image via a first communication path, and the receiving includes receiving a copy of the first frame image via a second communication path different in a frequency band from the first communication path, and the control is performed so that the second frame image received via one of the first communication path and the second communication path and a frame image size of a copy of the second frame image received via another communication path correspond to the time required to receive the frame image or the copy of the frame image that is received earlier.

12. A transmission method comprising:

transmitting a first frame image constituting a moving image to a reception apparatus, the first frame image having a first frame image size;

receiving designation of the first frame image size in accordance with a time required to receive the first frame image from the reception apparatus; and transmitting a second frame image constituting the moving image, the second frame image having a second frame image size, in which the second frame image size corresponds to the designation, to the reception apparatus in accordance with reception of the designation; wherein the transmitting includes transmitting the first frame image via a first communication path; and the transmitting includes transmitting a copy of the first frame image via a second communication path different in a frequency band from the first communication path, wherein the second frame image received by a reception apparatus via one of the first communication path and the second communication path and a frame image size of a copy of the second frame image received by the reception apparatus via another communication path correspond to the time required to receive the frame image or the copy of the frame image that is received earlier.

13. A non-transitory, computer readable storage medium containing a program, which when executed by a computer, causes the computer to carry out actions, comprising:

receiving a first frame image constituting a moving image by a reception section, the first frame image having a first frame image size; and performing control so that a frame image size of a second frame image constituting the moving image, which is received after the first frame image, corresponds to a time required to receive the first frame image by a frame-image size control section; wherein the receiving includes receiving the first frame image via a first communication path, and the receiving includes receiving a copy of the first frame image via a second communication path different in a frequency band from the first communication path, and the control is performed so that the second frame image received via one of the first communication path and the second communication path and a frame image size of a copy of the second frame image received via another communication path correspond to the time required to receive the frame image or the copy of the frame image that is received earlier.

14. A non-transitory, computer readable storage medium containing a program, which when executed by a computer, causes the computer to carry out actions, comprising:

transmitting a first frame image constituting a moving image to a reception apparatus by a transmission section, the first frame image having a first frame image size;

receiving designation of the first frame image size in accordance with a time required to receive the first frame image from the reception apparatus by a reception section; and transmitting a second frame image constituting the moving image, the second frame image having a second frame image size, in which the second frame image size corresponds to the designation, to the reception apparatus in accordance with reception of the designation; wherein the transmitting includes transmitting the first frame image via a first communication path; and the transmitting includes transmitting a copy of the first frame image via a second communication path different in a frequency band from the first communication path, wherein the second frame image received by a reception apparatus via one of the first communication path and the second communication path and a frame image size of a copy of the second frame image received by the reception apparatus via another communication path correspond to the time required to receive the frame image or the copy of the frame image that is received earlier.

* * * * *